United States Patent
Wajda

(10) Patent No.: US 7,490,173 B2
(45) Date of Patent: Feb. 10, 2009

(54) METHOD AND MULTIMODE USER INTERFACE FOR PROCESSING USER INPUTS

(75) Inventor: Wieslawa Wajda, Keltern (DE)

(73) Assignee: Alcatel, Paris (FR)

( * ) Notice: Subject to any disclaimer, the term of this patent is extended or adjusted under 35 U.S.C. 154(b) by 891 days.

(21) Appl. No.: 10/458,280

(22) Filed: Jun. 11, 2003

(65) Prior Publication Data

US 2004/0001100 A1    Jan. 1, 2004

(30) Foreign Application Priority Data

Jun. 27, 2002    (EP)    ................... 02360192

(51) Int. Cl.
- G06F 3/00 (2006.01)
- G06F 13/12 (2006.01)
- G06F 13/38 (2006.01)
- G06F 17/20 (2006.01)
- G10L 15/00 (2006.01)

(52) U.S. Cl. ............... 710/6; 710/14; 710/62; 710/63; 710/65; 704/1; 704/200; 704/231

(58) Field of Classification Search ........ 710/6, 710/14, 62, 63, 65; 704/1, 200, 231
See application file for complete search history.

(56) References Cited

U.S. PATENT DOCUMENTS

| | | | |
|---|---|---|---|
| 6,377,913 B1 * | 4/2002 | Coffman et al. | 704/8 |
| 6,948,129 B1 * | 9/2005 | Loghmani | 715/751 |
| 7,069,220 B2 * | 6/2006 | Coffman et al. | 704/275 |
| 7,149,690 B2 * | 12/2006 | August et al. | 704/270 |

FOREIGN PATENT DOCUMENTS

| | | |
|---|---|---|
| EP | 1076288 A2 | 2/2001 |
| WO | WO 9960465 | 11/1999 |
| WO | WO 0008547 | 2/2000 |

* cited by examiner

*Primary Examiner*—Niketa I Patel
(74) *Attorney, Agent, or Firm*—Sughrue Mion, PLLC

(57) ABSTRACT

The invention concerns a method and a multimode user interface for processing multimode user inputs, which are entered into a computer unit in various input modes within one specified application environment of several different ones, and converted there into different data streams. To make specially flexible processing of multimode user input possible, without having to switch manually between different input modes, it is proposed that within the data streams different information categories should be distinguished, depending on a context in which the data streams were generated, a suitable processing sequence of the information categories within the individual data streams should be determined, and the data streams should be processed in the determined sequence, the context comprising the current and/or past application environments.

15 Claims, 3 Drawing Sheets

METHOD AND MULTIMODE USER INTERFACE FOR PROCESSING USER INPUTS

BACKGROUND OF THE INVENTION

The invention is based on a priority application EP 02360192.5 which is hereby incorporated by reference.

This invention concerns a method of processing multimode user inputs, which are entered into a computer unit via various input means in various input modes within one specified application environment of several different ones, and converted there into different data streams.

The invention also concerns a multimode user interface, which processes multimode user inputs, which can be entered into a computer unit in various input modes within one specified application environment of several different ones, and converted there into different data streams.

Finally, this invention concerns a computer program for a multimode user interface, which can be run on a computing device, particularly a microprocessor, of the interface.

A method and user interface of the type mentioned above can be used, for instance, to control computer units, particularly PCs, mobile telephones and particularly to operate Internet-based or UMTS-based (Universal Mobile Telecommunications System) services. The user interface receives and processes user inputs which are entered by a user in a specifiable input mode, i.e. using various available input means such as a keyboard, a mouse, a tracker ball, a system for capturing and analysing hand-written input, a touch-sensitive screen, a speech recognition system, an optical system for capturing and analysing mimes and gestures of the user, or similar. In the computer unit, a data stream which depends on the type and content of the user input and the input modes which are used is generated.

The type of user input can be divided into different information categories. For instance, according to a broad division, the user input can be divided into the presentation, selection and execution information categories. In presentation, various services (selection options) are presented to the user optically, acoustically or otherwise. In selection, at least one of the selection options is selected, and information, particularly alphanumeric characters for texts, is input. For execution, a particular service, which has preferably previously been selected and supplied with information in the selection information category, is started and executed.

The user inputs can be generated within various application environments of a computer unit. According to this invention, the term "computer unit" is understood to include not only so-called PCs (personal computers), but any kind of electrical equipment which has a computing device, particularly a microprocessor, and which can be operated via user input. Thus, for the purposes of this invention, the term "computer unit" is understood to include a stationary or mobile telecommunication terminal. "Application environment" is understood to mean various application programs or parts of them, in which the user is during user input. In the case of a PC, for instance, an application environment for creating and editing text documents (text editor or text program) or an application environment for sending and receiving electronic messages (e-mail program) would be conceivable. In the case of telecommunication terminals, for instance, an application environment for writing, editing and receiving short messages (so-called SMS, Short Message Service) or an application environment for using telecommunication services, particularly WAP (Wireless Application Protocol) services, would be conceivable.

From WO 00/08547, a multimode user interface of the above-mentioned type and a method of processing the multimode user input of the above-mentioned type are known. However, this published specification is less about the processing sequence of the information categories within the individual data streams, but rather describes the type of processing of the individual data streams. In particular, it is proposed that a virtual machine (VM) correlates two or more different data streams with each other, and on the basis of the content of the two data streams which were processed last, determines an appropriate command for the computer unit. This command is then interpreted and executed in the computer unit, in a way which is known per se.

From the prior art, providing specified processing units (so-called interpreters) for service selection or service execution is also known. The user controls the change of interpreters, particularly which of the interpreters should be active for particular input modes and should interpret and/or execute commands irrespective of the information categories, through explicit instructions.

In the case of the method which is known from the state of the art for processing user input and the known multimode user interfaces, the strict delimitation between the various input modes for processing the individual data streams and the manual assignment of the interpreters by the user is disadvantageous. Thus, for instance, user input for executing a dialogue must be interpreted in a dialogue mode, and commands in a command mode. Parallel, flexibly controllable processing of multimode user input is impossible according to the prior art. In particular, it is impossible to control the processing by the computer unit fully automatically, by the user, depending on the context, i.e. the environment in which the user input was generated, and/or time-dependently.

SUMMARY OF THE INVENTION

This invention is therefore based on the object of forming and extending the processing of multimode user input in such a way that multimode communication between a user of a computer unit and the computer unit, particularly processing of multimode user input, and simultaneously a maximum of flexibility in the control of the processing of the user input, can be achieved.

To achieve this object, this invention proposes that, on the basis of the method of the above-mentioned type, different information categories should be distinguished within the data streams, a suitable processing sequence of the information categories within the individual data streams should be determined depending on a context, and the data streams should be processed in the determined sequence, the context comprising the current and/or past application environments. The processing sequence is preferably determined depending on the context in which the data streams were generated.

For the purposes of this invention, "context" is understood to mean, quite generally, the conditions in which the user input was generated. The context can comprise, for instance, current and/or past application environments. The concept of application environment not only includes various computer programs or applications which run on the computer unit, but can be subdivided as finely as desired. For instance, within a computer program it is conceivable to consider each individual menu item of an application which can be controlled via a menu as an individual application environment. The context can be specified by the computer unit or a user, or be time-dependent.

According to the invention, first, depending on the context in which the data streams were generated, specified input modes (e.g. input of user input via a keyboard, a mouse, speech input, video input etc.) are assigned to specified command categories (e.g. selection, input, execution etc.). This assignment takes place depending on the context in which the data streams were generated. In this way, at least one information category is assigned, depending on context, to the various input modes of a data stream. For each of the information categories, its own processing unit (so-called interpreter) is provided. The information categories are assigned to the individual input modes in a specified sequence. The individual data streams are then processed in this processing sequence. This means, for instance, that in an application environment for creating and editing text documents, the data streams are processed in a different sequence from, for instance, in an application environment for sending and receiving electronic messages.

User inputs in different input modes are included in a data stream. In a first context, the data stream which was generated by a specified input mode is first considered as belonging to a specified information category. For this reason, the data stream is first fed to the appropriate interpreter for interpretation and analysis. Only afterwards, e.g. when the analysis of the data stream in this interpreter is concluded or has led to no result, the data stream is fed to other interpreters for interpretation and analysis, in the determined processing sequence. In the same data stream, data which was generated in another input mode is also fed to different interpreters, one after another in a specified processing sequence, for processing and interpretation. The processing sequence thus depends on the input mode of the user input.

The sequence in which the data streams of individual input modes are searched according to the mentioned information category decides what is entered primarily using the input modes. If this sequence is determined by the context of the working environment, i.e. if, for instance, which application environment the user is in during input is analysed, the result is a specially advantageous method of working, which simplifies control of the computer unit or of services which the user can access via the computer unit.

Summarising, the user input is processed in the form of data streams, in an automatically determined processing sequence within the information categories. The processing sequence is determined for each data stream, depending on the input mode in which the user input was generated, and depending on the context in which the data stream was generated, in particular depending on the application environment in which the data stream was generated.

According to an advantageous extension of this invention, it is proposed that the processing sequence should be determined depending on the input modes. Preferably, the processing sequence is determined depending on the input modes in which the data streams were generated.

Advantageously, for each of the data streams to be processed for the various information categories, an appropriate processing sequence within a data stream is determined. The information category preferably includes the selection, input and execution categories. However, it is easily possible, without leaving the idea on which this invention is based, to divide the information categories into more categories, that is finer.

According to a preferred embodiment of this invention, it is proposed that the processing sequence in the current application environment should be determined on the basis of the processing sequence in past application environments. According to this embodiment, the context, depending on which the processing sequence is defined, is time-dependent. Additionally, in this embodiment the context is specified internally by the computer unit and not externally by the user or otherwise.

Alternatively, it is proposed that the processing sequence in the current application environment should be determined on the basis of settings which can be specified individually for each user. According to this alternative embodiment, therefore, the user can specify the processing sequence in which data of a specified input mode of the data stream should be processed. The specified settings are held in the computer unit or a central storage unit which is connected to the memory unit, and can be called up as required for the processing of the user input, and taken into account accordingly.

It is also useful that a processing sequence which the user specifies is selected depending on the processing sequence in past application environments. Thus the user can specify one or more processing sequences, from which a suitable one is then selected automatically depending on context.

Advantageously, in a current application environment for creating and editing text documents, a first data stream, which was entered in a keyboard entry mode, is first searched for alphanumeric sequences, and a second data stream, which was entered in a speech input mode, is first searched for control commands.

It is also proposed that in a current application environment for sending and receiving electronic messages, a first data stream, which was entered in a keyboard entry mode, is first searched for control commands, and a second data stream, which was entered in a speech input mode, is first searched for alphanumeric sequences.

As a further way of achieving the object of this invention, it is proposed, on the basis of the multimode user interface of the above-mentioned type, that the interface should distinguish different information categories within the data streams, and has means for determining a suitable processing sequence of the information categories within the individual data streams depending on a context in which the data streams were generated, and means for processing the data streams in the determined sequence. The context includes the current and/or previous application environments.

According to an advantageous extension of this invention, it is proposed that the means for processing the data streams should include multiple processing units (interpreters), each to process data of at least one specified information category. Advantageously, the interpreters are designed to process data of a specified information category. Advantageously, the interpreters are provided in the operating system and used by applications.

According to a preferred embodiment of this invention, it is proposed that the interface should have at least one distributor element, which passes on the incoming data streams to the appropriate means for processing the data streams depending on the determined processing sequence. Advantageously, the means for determining the processing sequence are part of at least one distributor element. Advantageously, the distributor elements are provided in the operating system and used by applications.

The implementation of the method according to the invention in the form of a computer program, which is provided for a multimode user interface, is particularly important. The computer program is capable of running on a computing device, particularly a microprocessor, of the interface, and suitable for executing the method according to the invention. In this case, therefore, the invention is implemented by a computer program, so that the computer program represents the invention in the same way as the method which it is suitable to execute. It is particularly preferred if the computer program is stored on a memory element, particularly on a read-only memory, a random access memory or a flash memory. The computer program preferably represents a part of an operating system.

Other features, possible applications and advantages of the invention are given by the following description of embodiments of the invention, which are shown in the drawing. All described or represented features, in themselves or in any combination, form the subject of the invention, irrespective of their combination in the patent claims or backward references, and irrespective of their formulation and representation in the description and drawings respectively.

DETAILED DESCRIPTION OF THE DRAWINGS

Figure 1:
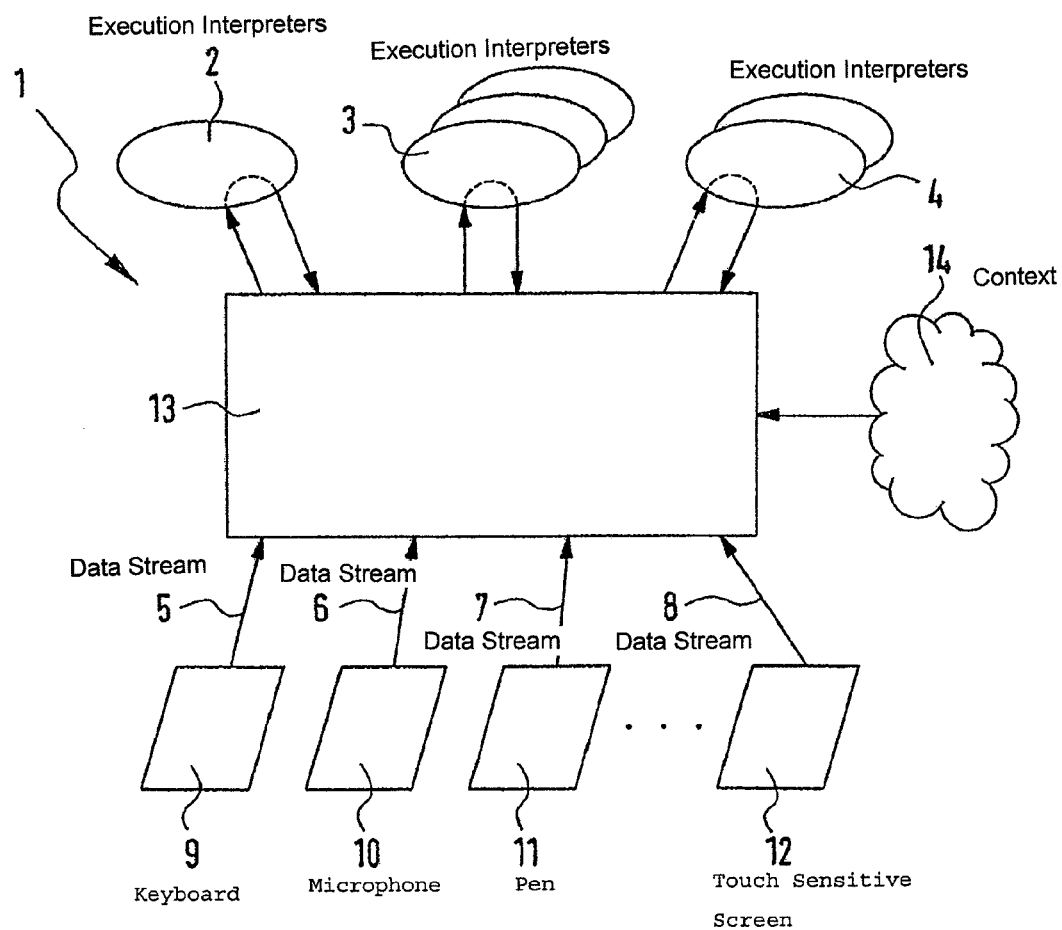
FIG. 1 shows a block diagram to clarify the processing method according to the invention and according to a preferred embodiment.

This invention concerns a multimode user interface, via which user input can be processed in the form of data streams. The user input is used to control and/or operate a computer unit, an application which runs on the computer unit, or a service which is implemented via a communication network, e.g. according to the WAP standard, using the computer unit. The computer unit can be in the form of a traditional PC (personal computer), but also a stationary or mobile telecommunication terminal, particularly to the GSM or UMTS standard. To input the user input, the computer unit has suitable input means, which are in the form of, for instance, an alphanumeric keyboard, a mouse, a tracker ball, a handwriting analysis device, a speech analysis device, or a device for analysing and processing gestures and mimes of the user. The user can thus enter the user input in various input modes via the input means.

Various applications are capable of running on the computer unit, so that the computer unit can be in various application environments depending on what applications are running. In the simplest case, the various application environments correspond to various application programs which are capable of running on the computer unit. For instance, an application environment for creating and editing text documents (text program) or an application for editing, sending and receiving electronic messages (e-mail program) is conceivable. However, it is quite conceivable that the application environments correspond, in a more finely subdivided case, to the individual functions or menu items of an application program.

On the one hand, the user input can be entered in various input modes. On the other hand, the user input can concern various information categories. Whereas the input modes concern the origin of the user input, the information categories concern the purpose of the user input, that is the question of what is to be achieved with the user input. Information categories are, for instance, presentation, selection and execution. In presentation, various services (selection options) are presented to the user optically, acoustically or otherwise. In selection, at least one of the selection options is selected, and information, particularly alphanumeric characters for texts, for instance the text of a letter, is input. For execution, a particular service, which has preferably previously been selected and supplied with information in the selection information category, for instance saving a letter or sending an e-mail, is started and executed. The subdivision of user input into the presentation, selection and execution information categories is relatively coarse, but covers the possible user inputs almost completely. Obviously, the information categories can be subdivided almost arbitrarily finely.

According to this invention, a suitable processing sequence of the various information categories is determined for each individual data stream. The processing sequence is determined depending on a context in which the user input was entered and the data streams were generated. The context includes, in particular, the current application environment in which the data streams were generated, and/or past application environments. The data streams are then processed in the determined processing sequence. The processing sequence is thus determined for the information categories of the data streams depending on the context.

The method according to the invention has the advantage that the user can communicate multimodally with the computer unit without having to switch between different information categories. This is possible because according to the method according to the invention—otherwise than in the prior art—a strict separation between the various information categories of the user input is no longer required for processing the data streams.

To execute the method according to the invention, a multimode user interface which has several processing units (so-called interpreters) to process the data streams is provided. The incoming data streams are passed on to specified interpreters for processing, depending on the determined processing sequence. An interpreter is responsible for processing the user input of at least one specified information category. Additionally, the user interface has a distributor element, which passes on the incoming data streams to the appropriate interpreters depending on the determined processing sequence.

An important aspect of this invention can be seen, on the one hand, in the distribution element, which determines a processing sequence for an incoming data stream depending on the context and the input mode, and passes on the data streams to the corresponding interpreters. On the other hand, this invention can be seen in the processing units, which are responsible for processing the data streams of a specified information category. The flexible processing of the multimode user input without strict subdivision of the user input into different information categories only becomes possible in this way. In this way, multimode operation of a computer unit or multimode use of specified services via the computer unit are decisively simplified.

The interpreters convert the data streams which are assigned to them, in a way which is known in itself, into a computer-internal uniform representation, so that the computer unit, or a computing device, particularly a microprocessor, of the computer unit can process the data streams.

In FIG. 1, a multimode user interface according to the invention is marked as a whole with the reference symbol 1. The interface 1 includes multiple interpreters 2, 3, 4 working in parallel. A selection interpreter 2 processes the part of the data streams which is used to select a specified function or a specified menu item in an application program (selection). Three input interpreters 3 are provided, and process those parts of the data streams which are used for input of texts or similar. Finally, the interface 1 includes two execution interpreters, which are used to process those parts of the data streams by which specified functions are triggered.

User input is entered via various input means 9, 10, 11, 12 into a computer unit, where it is converted into data streams and fed to a distributor unit 13 of the interface 1. The input means include a keyboard 9, a microphone 10 for speech input, a pen 11 for user input via a touch-sensitive screen and a device 12 for capturing and processing the mimes or gestures of a user of the computer unit. Additionally, a handwriting analysis device can be provided. The data streams 5, 6, 7, 8 were thus generated in different input modes.

In the distributor unit 13, a suitable processing sequence of the data streams 5, 6, 7, 8 is determined depending on a context 14. Additionally, the data streams 5, 6, 7, 8 are fed by the distributor unit 13 to the interpreters 2, 3, 4 in the determined processing sequence, for processing by the interpreters 2, 3, 4. The interpreters 2, 3, 4 can feed the data stream 5, 6, 7, 8 to consumers or pass it back, changed or unchanged, to the distributor unit 13, so that the data stream 5, 6, 7, 8 can be fed to further interpreters 2, 3, 4 for further processing.

In a current application environment for sending and receiving electronic messages (context "e-mail program"), the data stream 6, which is generated in the input mode "speech" via the microphone 10, is first interpreted as an alphanumeric sequence. It is therefore assumed that the information which is entered via the data stream 6 represents the text of the electronic message. The data stream 5, which is generated in the input mode "keyboard" via the keyboard 9, is searched for commands which primarily control the e-mail program or represent the specified commands for the operating system.

In another current application environment for creating and editing text documents (context "text program"), a first data stream 5, which was entered in a keyboard input mode via the keyboard 9, is first searched for control commands. In other words, to create electronic messages, the user can conveniently dictate the message text in speech and simultaneously enter control commands using the keyboard 9. Separation of input commands which are input in speech and control commands which are entered using the keyboard 9 is not required according to the invention. In particular, the user of the computer unit does not have to select different interpreters for processing the input and control commands manually. On the contrary, to create text documents the user can enter the text using the keyboard 9 and move in the text using speech and/or enter formatting commands under speech control. The desired processing sequence is determined automatically in the processing unit 13 depending on the context 14, in this embodiment on the basis of specified, user-defined selection parameters. By specifying the parameters, the desired processing sequence for the various contexts can be ensured.

Alternatively, the context can also be determined depending on time or rules of the computer unit, particularly depending on past application environments. For instance, it is highly probable that a data stream should be processed in a particular processing sequence if the data stream was previously processed in the same or a similar context according to the same sequence.

For the actual analysis of the data streams, i.e. to determine the actual meaning of a statement which is included in the data streams and of commands which are included in them, and to represent the knowledge which is included in them, various scientific theories and models are known from the prior art. These include, for instance, semantic networks, so-called frame systems, predicate logics and ontologies (in this connection, ontology is the logical theory of the meaning of a particular word). One example of context analysis in dialogue, where the dialogue can be continued depending on what answer is given, is published in the Internet under http://www.lingcom.com/germany/support/examples/article/example_0003.ht m. However, this invention does not so much concern the question of how the content of the data streams is interpreted in the interpreters 2, 3, 4. Rather, this invention concerns the question of how the interpreters 2, 3, 4 are organised and according to what criteria the data streams 5, 6, 7, 8 are distributed by the distributor unit 13 to the interpreters 2, 3, 4.

As well as depending on the application environment, the context 14 can also depend on the time, i.e. it can be changed, for instance, using specifiable time intervals (so-called timers). For instance, it is possible to switch automatically into the context "keyboard input" as soon as the user begins to type on the keyboard 9. As soon as the user stops using the keyboard 9, the context 14 first automatically remains in the context "keyboard input" for a specifiable duration, before it switches to the context "command input via speech" after expiry of the duration.

Figure 2:
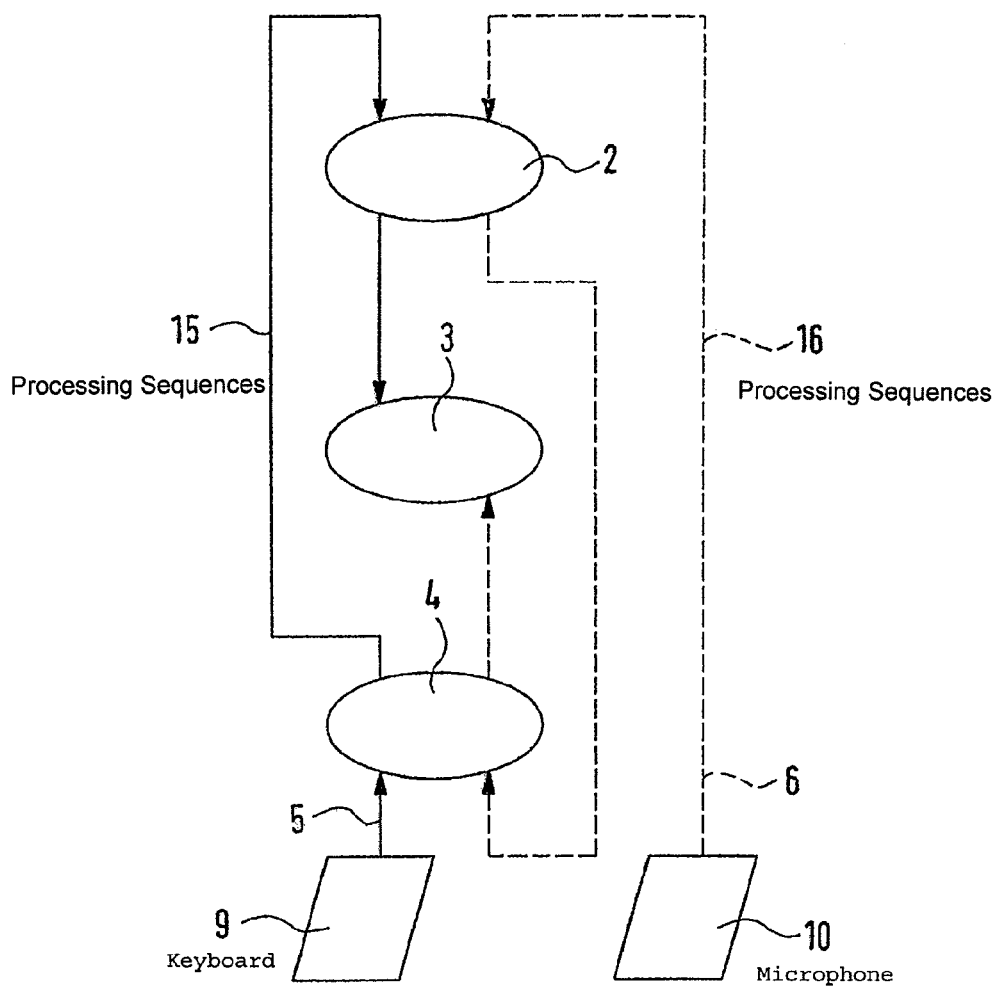
FIG. 2 shows a flowchart to clarify the processing sequences in which user input is processed within the method according to the invention.

In FIG. 2, two different processing sequences 15 (continuous line) and 16 (dashed line) are shown as examples. The data stream 5 from a keyboard 9 is fed by the distributor unit 13 first to the interpreter 4, and then to the interpreters 2 and 3 (processing sequence 15). On the other hand, the data stream 6 from a microphone 10 is fed first to the interpreter 2, and then to the interpreters 4 and 3 (processing sequence 16).

Figure 3:
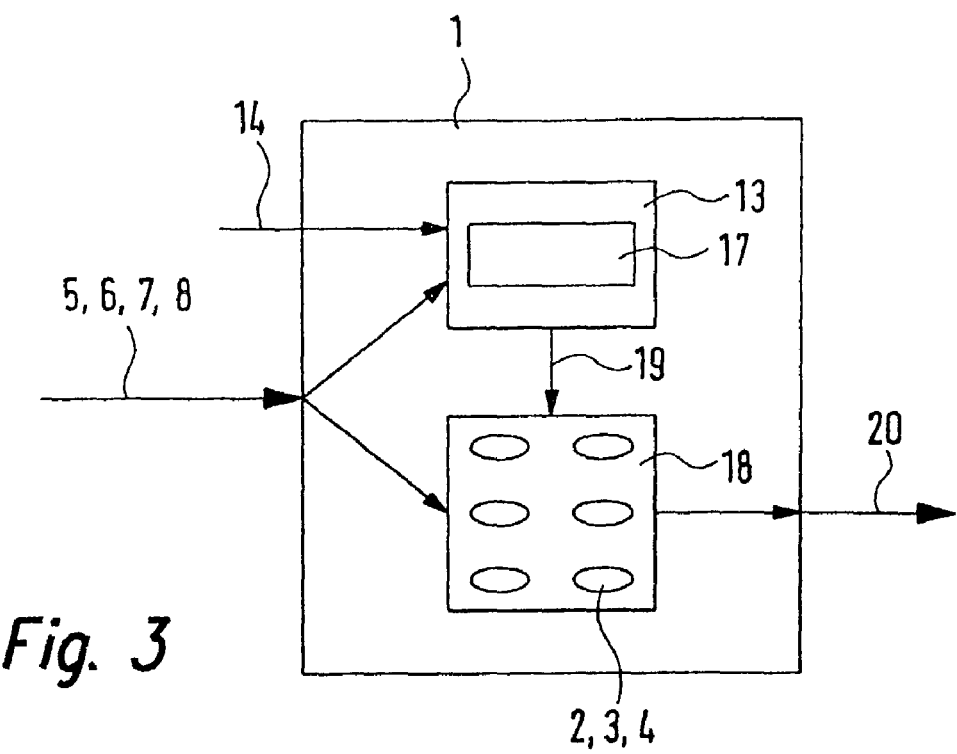
FIG. 3 shows a functional structure of a multimode user interface according to the invention and according to a preferred embodiment.

FIG. 3 shows the functional structure of the multimode user interface 1 according to the invention. The data streams 5, 6, 7, 8 are fed to the interface 1. In the interface 1, the distributor element 13 and processing means 18 for processing the data streams are provided in the determined sequence. The distributor element 13 includes means 17 for determining a suitable processing sequence. The processing means 18 include the interpreters 2, 3, 4, which are each provided to process data of at least one specified information category. The processing sequence 15, 16 which is determined by the means 17 is passed on to the processing means 18 (cf. arrow 19). After the processing of the data streams 5, 6, 7, 8 in the processing means 18, the appropriate commands and/or input information are passed on to the computer unit (arrow 20).

Figure 4:
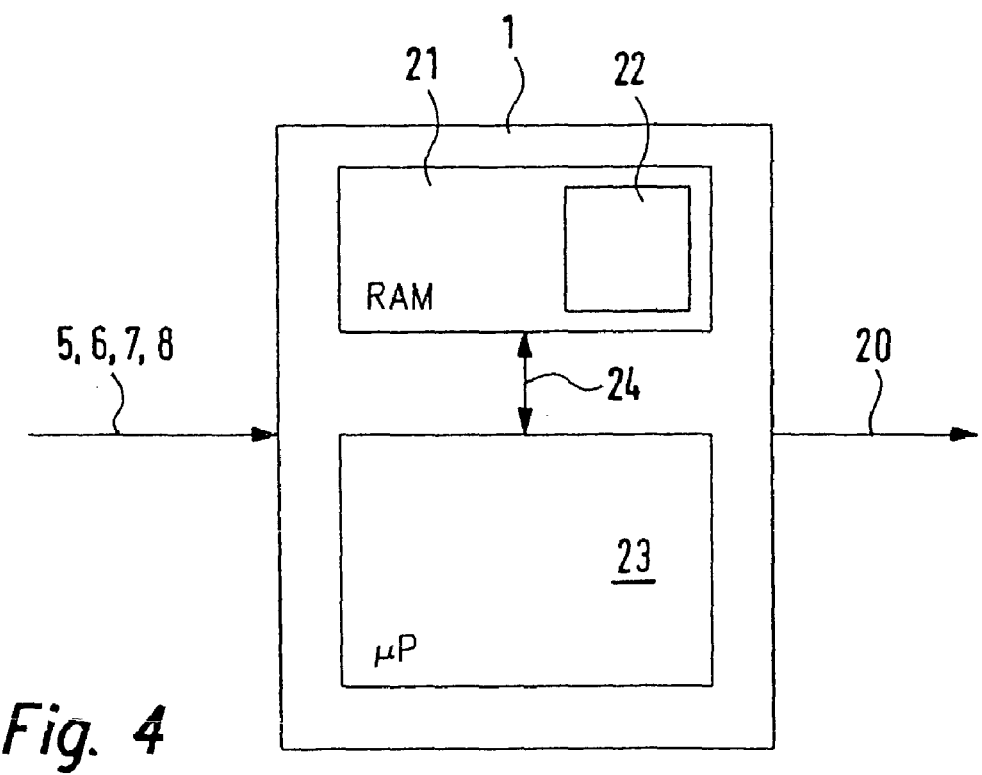
FIG. 4 shows a schematic structure of the user interface from FIG. 3.

In FIG. 4, the structural structure of the multimode user interface 1 according to the invention is shown. The interface 1 includes a memory element 21, which is in the form of a flash memory. In the memory element 21, a computer program 22, which is capable of running on a computing device 23 of the interface 1 and is suitable for executing the method according to the invention, is stored. The computing device 23 is, in particular, in the form of a microprocessor. To execute the computer program 22, it is transmitted via a data connection 24 to the microprocessor 23, either as a whole or in sections. In the opposite direction, results or other data which are acquired in the course of executing the computer program 22 in the microprocessor 23 are passed to the memory element 21 via the data connection 24 and stored there. Both the memory element 21 and the microprocessor 23 can be provided as separate components in the interface 1. However, it is also possible that the memory element 21 and microprocessor 23 are part of the computer unit to which the user interface 1 is assigned.

The invention claimed is:

1. A method of processing multimode user inputs in a computer unit connected to various input means in various input modes, the method comprising:

entering a plurality of user inputs generated from the various input means in the various input modes to execute an application running on the computer unit;

providing a plurality of information categories representing a plurality of interpreters interpreting the user inputs with respect to the application;

converting the user inputs into respective data streams;

determining a respective processing sequence of each of the respective data streams by assigning the information categories to the each of the respective data streams differently depending on a context of the user inputs, the respective data streams being distinguished from one another by how the information categories are assigned; and processing the respective data streams in the determined respective processing sequences to execute the application, wherein the context comprises at least one of the application and an application previously executed in the computer unit, and wherein when the plurality of the user inputs are entered to execute the application, the information categories are assigned to the each of the respective data streams not manually by a user of the various input means in the various input modes.

2. The method according to claim 1, wherein the processing sequence is determined depending on the various input modes.

3. The method according to claim 1, wherein for the each of the respective data streams to be processed for the assigned at least one of the information categories, a suitable processing sequence within the each of the respective data streams is determined.

4. The method according to claim 1, wherein the processing sequence in the current application environment is determined on the basis of the processing sequence in past application environment.

5. The method according to claim 1, wherein the processing sequence for the current application environment is determined from settings which can be specified individually for each user of the various input means in the various input modes.

6. The method according to claim 1, wherein in the current application environment for creating and editing text documents, a first data stream among the respective data streams, which is entered in a keyboard entry mode among the various input modes, is first searched for an alphanumeric sequence, and a second data stream among the respective data streams, which is entered in a speech input mode among the various input modes, is first searched for a control command.

7. The method according to claim 1, wherein the current application environment corresponds to an electronic mail application for sending and receiving electronic messages, and wherein a first data stream among the respective data streams, which is entered in a keyboard entry mode, is first searched for a control command, and a second data stream among the various input modes, which is entered in a speech input mode, is first searched for an alphanumeric sequence.

8. A multimode user interface processing multimode user inputs entered into a computer unit via various input means in various input modes, the interface comprising:

means for receiving a plurality of user inputs generated from the various input means in the various input modes to execute an application running on the computer unit;

a plurality of information categories representing a plurality of interpreters interpreting the user inputs with respect to the application;

means for converting the user inputs into respective data streams;

means for determining a respective processing sequence of each of the respective data streams by assigning the information categories to the each of the respective data streams differently depending on a context of the user inputs, the respective data streams being distinguished from one another by how the information categories are assigned; and means for processing the respective data streams in the determined respective processing sequences, wherein the context comprises at least one of the application and an application previously executed in the computer unit, and wherein when the plurality of the user inputs are entered to execute the application, the information categories are assigned to the each of the respective data streams not manually by a user of the various input means in the various input modes.

9. The interface according to claim 8, wherein the means for processing the respective data streams comprises multiple processing units, each of the multiple processing units processing data of at least one of the information categories.

10. The interface according to claim 9, wherein the plurality of interpreters are used to process data of the information categories.

11. The interface according to claim 8, the interface has at least one distributor element that passes on the respective data streams to the means for processing the respective data streams depending on the determined respective processing sequences.

12. The interface according to claim 11, wherein the means for determining a respective processing sequence is part of the at least one distributor element.

13. A computer readable storage medium having stored thereon a computer program for executing a method of claim 1.

14. The computer readable storage medium according to claim 13, wherein the computer program is stored on a memory element, particularly on a read-only memory, a random access memory or a flash memory.

15. The method according to claim 1, wherein the information categories comprise:

a selection information category allowing selection of a function of the application;

an input information category allowing inputting alphanumeric characters using the application; and an execution information category allowing triggering the function of the application.

* * * * *